(12) United States Patent
Blandy

(10) Patent No.: US 8,216,336 B2
(45) Date of Patent: Jul. 10, 2012

(54) METHOD FOR INTEGRATED POWER GENERATION AND ORGANIC FERTILISER PRODUCTION

(75) Inventor: Charles William Douglas Blandy, Canterbury (AU)

(73) Assignee: Industrial Ecosystems Pty Ltd, Melbourne, Victoria (AU)

( * ) Notice: Subject to any disclaimer, the term of this patent is extended or adjusted under 35 U.S.C. 154(b) by 711 days.

(21) Appl. No.: 12/227,332

(22) PCT Filed: May 17, 2007

(86) PCT No.: PCT/AU2007/000673
§ 371 (c)(1),
(2), (4) Date: Nov. 14, 2008

(87) PCT Pub. No.: WO2007/131301
PCT Pub. Date: Nov. 22, 2007

(65) Prior Publication Data
US 2009/0173123 A1    Jul. 9, 2009

(30) Foreign Application Priority Data
May 17, 2006    (AU) ................................ 2006902645

(51) Int. Cl.
*C05F 11/08* (2006.01)
*F02C 6/04* (2006.01)

(52) U.S. Cl. ............... 71/8; 60/783; 71/9; 71/10; 71/11; 71/23

(58) Field of Classification Search ................. 71/8–30; 60/783
See application file for complete search history.

(56) References Cited

U.S. PATENT DOCUMENTS

| | | | | | |
|---|---|---|---|---|---|
| 4,710,300 | A | * | 12/1987 | Kristoufek | 210/603 |
| 6,387,272 | B2 | * | 5/2002 | Hirth et al. | 210/652 |
| 6,682,578 | B2 | * | 1/2004 | Sower | 71/11 |
| 6,699,708 | B1 | * | 3/2004 | Muller et al. | 435/262 |
| 2003/0126899 | A1 | * | 7/2003 | Wolken | 71/11 |
| 2003/0172697 | A1 | * | 9/2003 | Sower | 71/11 |
| 2004/0129188 | A1 | * | 7/2004 | Traina | 110/233 |
| 2006/0130546 | A1 | * | 6/2006 | Beaton et al. | 71/24 |

FOREIGN PATENT DOCUMENTS

| | | |
|---|---|---|
| DE | 44 40 750 | 5/1996 |
| DE | 197 15 646 | 10/1998 |
| JP | 2002-361217 | 12/2002 |
| WO | 2004/046065 | 6/2004 |
| WO | 2005/005786 | 1/2005 |

* cited by examiner

*Primary Examiner* — Wayne Langel
(74) *Attorney, Agent, or Firm* — Clark & Brody

(57) ABSTRACT

The invention relates to an integrated power generation and organic fertilizer production system and method including: a biomass combustion-fuelled power station (12); a facility (14) for producing pelletized organic fertilizer (46); and means for capturing and redirecting waste heat from the power station (12) to the facility (14), to be used in producing pelletized organic fertilizer (46).

11 Claims, 3 Drawing Sheets

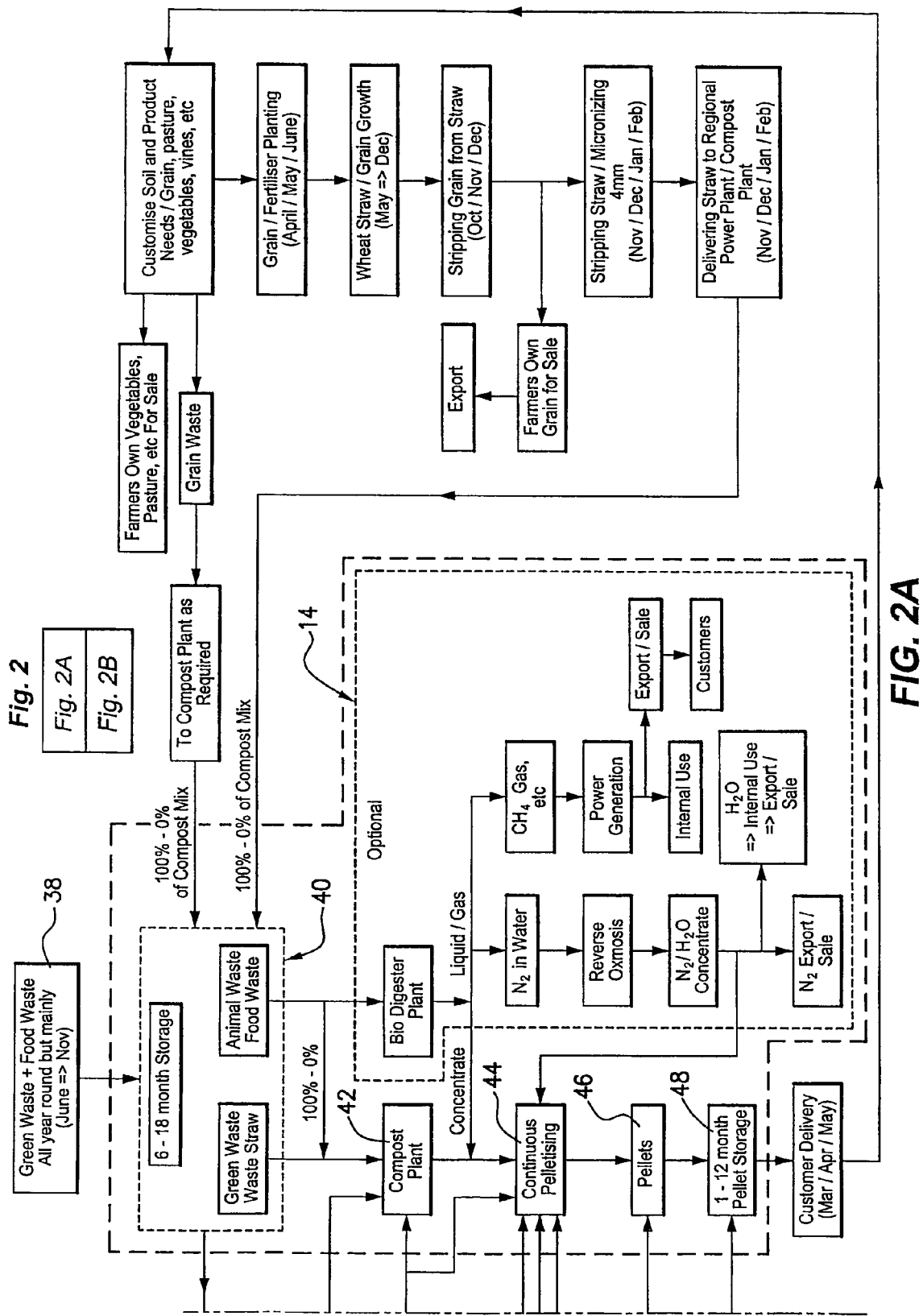

METHOD FOR INTEGRATED POWER GENERATION AND ORGANIC FERTILISER PRODUCTION

FIELD OF THE INVENTION

The present invention relates to a power generation system. In particular the present invention relates to an integrated system for generating power and organic fertiliser from renewable biomass.

BACKGROUND OF THE INVENTION

In this specification, where a document, act or item of knowledge is referred to or discussed, this reference or discussion is not an admission that the document, act or item of knowledge or any combination thereof was at the priority date:
(i) part of common general knowledge; or
(ii) known to be relevant to an attempt to solve any problem with which this specification is concerned.

The majority of scientific opinion is to the effect that global warming (also known somewhat euphemistically as "climate change") is real, and could have devastating environmental and economic consequences. Global warming is caused by ever increasing levels of carbon dioxide present in the atmosphere, which are released when fossil fuels are burned, such as to produce electricity. When burned, carbon which has been stored in the fossil fuel (such as coal) for many thousand of years is converted to carbon dioxide and released into the atmosphere.

Ways to make coal burn "cleaner", in terms of the amount of carbon dioxide released into the atmosphere, are being investigated, as well as ways of "sequestering" carbon dioxide, such as by storage in underground or undersea geological formations.

Power generators that are fired by the combustion of biogases, such as methane, may contribute less to global warming than coal-fired powered stations. As discussed in published German patent specifications DE4440750 (Schirmer Umwelttechnik GMBH) and DE 19715646 (Paesler), and published Japanese specifications JP2002361217 (Kubota KK), biogases that are suitable for use in this context may be produced as a by-product from processing of animal and/or municipal waste through processes such as anaerobic fermentation.

Power-generation facilities that release negligible carbon dioxide have also been investigated. For example, solar and wind power-generation facilities are used in many parts of the world. Although eminently cleaner than power-generation systems based on burning fossil fuels and biofuels, they are far less efficient, and depend on the existence of particular environmental conditions (i.e. sunlight and wind). Of course the times when such conditions are not present are effectively "down time" for the power-generation system.

Power-generation facilities that do not increase the net amount of carbon dioxide in the atmosphere have also been proposed. Power-generation facilities based on biomass are an example and are already in use in some parts of the world. Biomass is a naturally produced organic fuel that may be specifically grown as fuel (such as wood chips) or obtained as a waste product from other processes, such as "green waste" from agricultural processes.

Biomass is burned in the same way as fossil fuel to produce heat to power a boiler, which in turn drives steam-powered turbines to generate electricity. Other uses of biomass to produce energy are also known such as for making bio-diesel, and its use in gasification processes.

Although burning biomass releases carbon dioxide into the atmosphere, the net amount of carbon dioxide does not increase, because of the removal of carbon dioxide from the atmosphere due to the occurrence of photosynthesis as the biomass was grown.

Biomass power stations are promising in that they do not rely on particular environmental conditions as do solar and wind energy. Biomass is also a renewable energy source which can be easily grown and/or obtained from waste products.

An example of a biomass power system is given in published United States Patent Application No US2004/0129188, which describes a power-generation system where biomass—which is grown in a biomass field near a furnace—is periodically harvested and burned in the furnace to power a generator. The goal of the system is to obtain a "partially closed loop", to which only sunlight and air are added and in which a biomass field supplies all the fuel needed to produce the desired amount of electricity. The goal is said to be achieved by recycling waste heat and other by-products of biomass combustion, such as carbon dioxide, water vapour and ash, back into the biomass field as input energy and nutrients.

Whilst the system has advantages over traditional biomass power stations there nevertheless remains a need for a system that makes more effective use of the by-products of biomass combustion than is described in the above document.

WO 2005/005786 describes a process where excess airflow is introduced during biomass combustion to increase nitrogen oxide and nitrogen dioxide production (referred to as $NO_x$). In addition, the oxidation area of the boiler is operated at a temperature exceeding 2000° F. and flue gases are maintained in the high temperature environment for an increased residence time to further increase NO and $NO_2$ production. Flyash from the incinerated biomass is then filtered from the flue gases exhausted from the boiler, with $NO_x$ removed from the filtered flue gas and used in the production of a nitrogen fertiliser. The nitrogen fertiliser itself is also blended with the flyash to form a "balanced fertiliser product" used to grow additional biomass material.

Again, whilst the system described in the above document has advantages over traditional biomass power stations, there nevertheless remains a need for a system that makes more effective use of the by-products of biomass combustion than is described in that document.

SUMMARY OF THE INVENTION

According to a first aspect of the present invention there is provided an integrated power generation and organic fertiliser production system including:
a biomass combustion-fuelled power station;
a facility for producing pelletised organic fertiliser; and
means for capturing and redirecting waste heat from the power station to the facility, to be used in producing pelletised organic fertiliser.

In the present specification, including the claims, the term 'organic fertiliser' signifies a fertiliser that is derived from organic matter, but may be supplemented with inorganic additives, such as nitrogen, phosphorous and/or potassium.

The use of waste heat in the production of pelletised organic fertiliser is a very effective, and hitherto unknown, use of a by-product of biomass combustion. In particular, a continuous supply of low-grade waste heat that is redirected from a biomass combustion-fuelled power station greatly enhances processes for both producing organic fertiliser and for pelletising that fertiliser. One particular advantage of the present invention is that it tends to produce rounded, hard pellets that can pass easily through fertiliser seeding machines.

Preferably, the facility is configured to produce pelletised organic fertiliser over a period of about 2 to 18 months and optimally over a period of about 12 months.

The production of organic fertiliser over these periods is particularly advantageous in that it results in the production of very good quality pelletised fertiliser, and also aligns well with the usual cycle of cereal-crop growth. This synergy enables waste biomass from cereal crop production, that is typically available after each years harvest, to be used as the biofuel for the power station, and as a starting material for production of the organic fertiliser.

In particularly preferred embodiments, the facility is configured to produce pelletised organic fertiliser by:

utilising redirected waste heat from the power station in composting organic materials over a period of about 2 to 18 months; and pelletising the composted organic material into pelletised organic fertiliser.

The use of waste heat in this embodiment is particularly advantageous in that optimal composting takes place over a period of approximately 6-12 months at elevated temperatures, in order to allow the carbon and nitrogen containing compounds in the organic materials to be transformed by successive microbial action into more stable complex forms, suitable for application to the soil. The present invention provides a continual supply of low-grade waste heat from a carbon-neutral biomass combustion-fuelled power station to effect these elevated temperatures and to otherwise contribute to the composting process.

Furthermore, high quality compost produced over about 6-12 months may be pelletised into hard, porous pellets because of the "self-binding" tendencies of compost produced over that time period.

Typically, the facility is further configured to utilise redirected waste heat in drying the composted organic material before pelletisation and/or in storing the pelletised organic fertiliser.

The organic fertiliser is preferably dried before it can be easily pelletised and the pellets should also be stored for 2-12 months or more, as they can degrade markedly in the presence of moisture, causing unwanted pellet softening. The pellets then should be stored at a suitable temperature in order to maintain pellet hardness. Again, use of the continual supply of waste heat from the biomass-fuelled power station enables pellets to be kept dry and hard for long periods of time.

In some embodiments, such as those utilising waste biomass from cereal crop production, the same material may used as a fuel source for the power station and as a feed source component for producing pelletised organic fertiliser in the facility. The advantages of these embodiments are discussed above. Micronised wheat straw is particularly advantageous in this regard.

Optionally, the facility may be configured to incorporate inorganic additives into the pelletised organic fertiliser, such as in a ratio of approximately 60% organic material to 40% inorganic additives. According to these embodiments, where organic fertiliser is mixed with inorganic fertilisers, such as diammonium phosphate (DAP), monoammonium phosphate (MAP), urea etc, this balance of around 60% organic to 40% inorganic is preferred in order to maintain pellet hardness necessary for efficient distribution by fertiliser seeding machines. Again, the heat is supplied as waste heat from the biomass-fueled power station.

Thus, the present invention utilises waste heat produced in an effectively carbon dioxide neutral biomass-fuelled power station to supply an organic fertiliser production facility that itself uses biomass as a feed source. Therefore the system operates to remove carbon dioxide from the atmosphere at 2 sources i.e. to grow biomass for production of energy, as well as for the production of organic fertiliser.

Pelletised organic fertilisers are also showing great promise in restoring carbon nutrients to the soil—thereby removing carbon dioxide from the atmosphere—and at the same time increasing soil fertility and associated crop yields. Pelletised fertiliser reduces the volume of organic material that must be supplied to the soil, as individual pellets may be placed adjacent to or below the seed, such as to a depth of around 3 cm.

Pelletised fertiliser also lends itself well to precision farming techniques that employ GPS location technology and previously collected data as to local soil characteristics, to calculate and automatically sow a fertiliser pellet at a desired location.

The benefit of the pelletised organic fertiliser to the soil in which the biomass is grown is also cumulative, resulting in increased biomass production, which in turn removes more carbon dioxide from the atmosphere.

Furthermore, use of the biomass-fuelled power station reduces the reliance on fossil fuel-based energy production, thereby resulting in even less release of carbon dioxide into the atmosphere.

According to a second aspect of the present invention there is provided a method for integrated power generation and organic fertiliser production, including the steps of:

combusting biomass in a power station to produce power;
producing pelletised organic fertiliser; and
capturing and redirecting waste heat from the power station, to be used during the producing step.

Preferably, the producing step comprises producing pelletised organic fertiliser over a period of about 2 to 18 months.

Optimally, the producing step comprises producing pelletised organic fertiliser over a period of about 12 months.

The producing step may comprise:

utilising redirected waste heat from the power station in composting organic materials over a period of about 2 to 18 months; and pelletising the composted organic material into pelletised organic fertiliser.

The producing step may further comprise utilising redirected waste heat in drying the composted organic material before the pelletising step.

Optionally, the method includes the further step of utilising redirected waste heat in storing the pelletised organic fertiliser.

Typically, the same material is used in the combusting step to produce power and in the producing step, to produce pelletised organic fertiliser. For example, the material may be straw from a cereal crop, such as micronised wheat straw.

DESCRIPTION OF THE DRAWINGS

An embodiment of the present invention will now be described by reference to the following drawings in which:

Turning to FIG. 1, a power station 12 is illustrated. The power station utilises biomass as an energy source in order to produce electricity. Typically, electricity is produced by combusting the biomass which also results in the production of waste heat.

Figure 1:
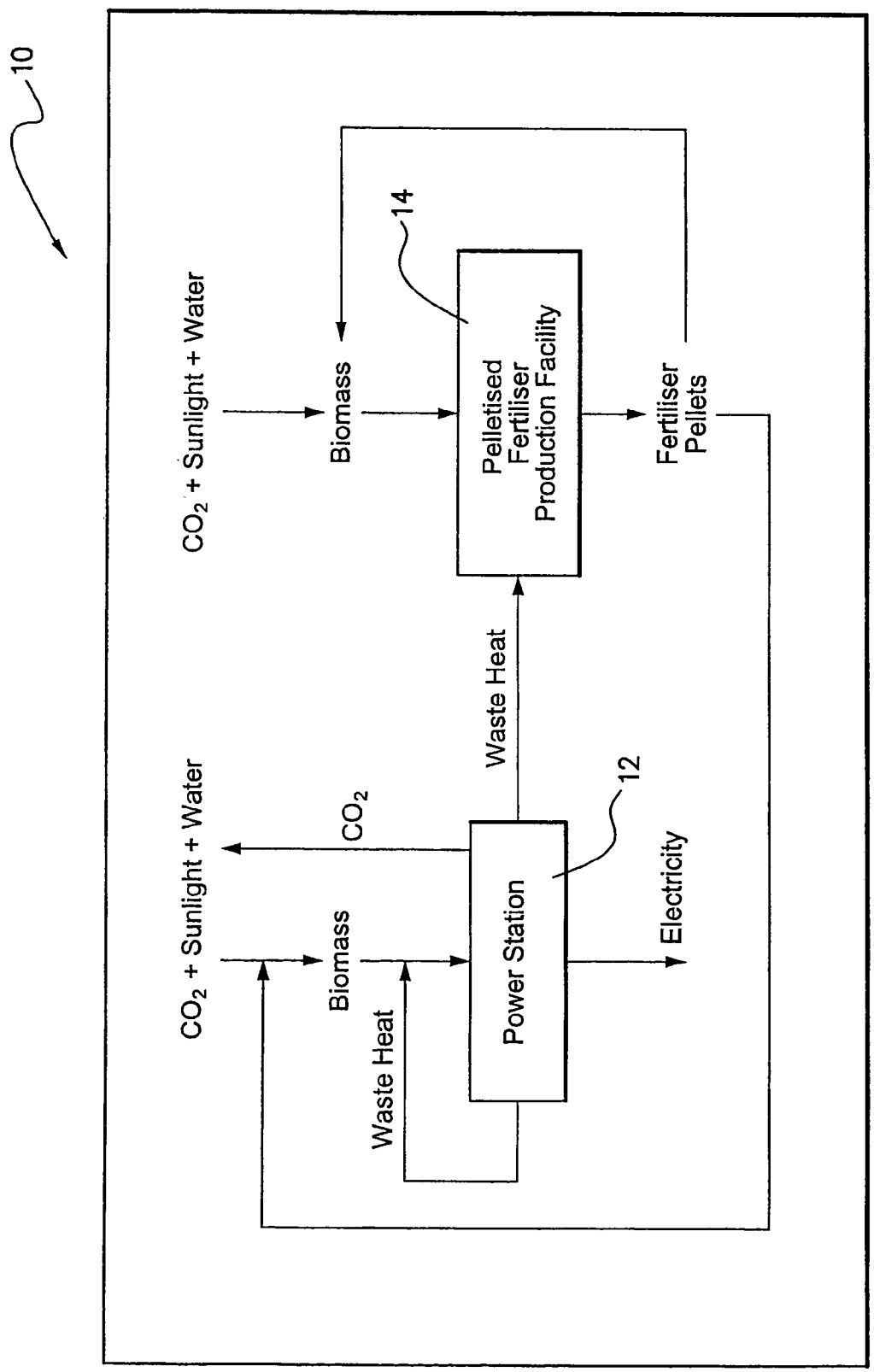
FIG. 1 is a schematic illustration of a power generation system in accordance with the present invention.

A fertiliser production facility 14 also utilises biomass in order to produce fertiliser. Of course, biomass is itself produced through the process of photosynthesis, which combines carbon dioxide plus sunlight and water to produce oxygen, water and carbohydrate.

Waste biomass is a convenient source of raw material for the organic fertiliser and in particular, waste straw from grains production (wheat, barley, canola etc). This biomass is typically high in carbon, but low in other essential plant nutrients, and in particular nitrogen. For efficient composting, the raw straw should be mixed with other nitrogen-rich biomass, such as green leaf waste and/or animal waste such as cow, chicken or pig manure. A suitable proportion has been found to be about 70% straw, 30% nitrogen supplementing biowaste. Wheat straw has around 47% carbon content, as opposed to around 20-30% for animal waste and around 15-25% for other green waste. Hence composting wheat straw means that an increased mass of carbon is "sequestered" into organic fertiliser. The carbon is further sequestered when the fertiliser is applied to the soil and in particular when placed under the soil surface.

According to the applicant's research, pelletised organic fertilisers are showing promising results in restoring carbon nutrients to the soil—thereby removing carbon dioxide from the atmosphere—and at the same time increasing soil fertility and associated crop yields. Pelletised fertiliser reduces the volume of organic material that must be supplied to the soil, as individual pellets may be placed adjacent to or below the seed, such as to a depth of around 3 cm.

The following table demonstrates the properties of pelletised organic fertiliser in this regard. The "C index" in the table below is defined as the percentage increase in yield per unit of Carbon divided by 100. It will be noted that the tests indicate a significantly higher C. Index for pelletised organic fertiliser applied 3 cm underneath the relevant seed, when placed in a 3 cm slot.

Pelletised fertiliser also lends itself well to precision farming techniques that employ GPS location technology and previously collected data as to local soil characteristics, to calculate and automatically sow a fertiliser pellet at a desired location.

Without wishing to be bound by theory, an implication can be derived from the abovementioned tests, that the best growth results in low carbon soils (around 0.6% carbon) is due to plant roots having direct access to N and P (as would occur with known inorganic fertilizers), but mixed in a strong inorganic fertilizer pellet, so as to prolong the release of N and P over the whole of the plant's growing period. This is thought to be related to the amount of energy needed by the plant to access N and P directly from inorganic fertilizers is less than accessing recycled N and P via organic fertiliser raw materials (such as green waste, animal waste, wheat straw etc). By ignoring recycled N and P, and supplying N and P direct via the inorganic additives to the fertilizer pellets, the above C index results may be able to be improved further.

Inside the 3 cm v 3 cm wheat seedling slot the pelletised organic/inorganic fertiliser would have a carbon content of around 15%-40% of carbon nutrients, (depending on the raw material used to make the organic component) compared to a soil background carbon of around 0.5%-5% in most grain growing areas of Victoria. A wheat seed placed above and adjacent to the pelletised organic/inorganic fertiliser can thus be seen to have a substantial plant and root growth accelerator applied over its whole growing period. The benefit is not available from known inorganic NPK fertilisers that have no carbon nutrients.

The benefit of the pelletised organic fertiliser to the soil in which the biomass is grown is also cumulative, resulting in increased biomass production, which in turn removes more carbon dioxide from the atmosphere.

Figure 2B:
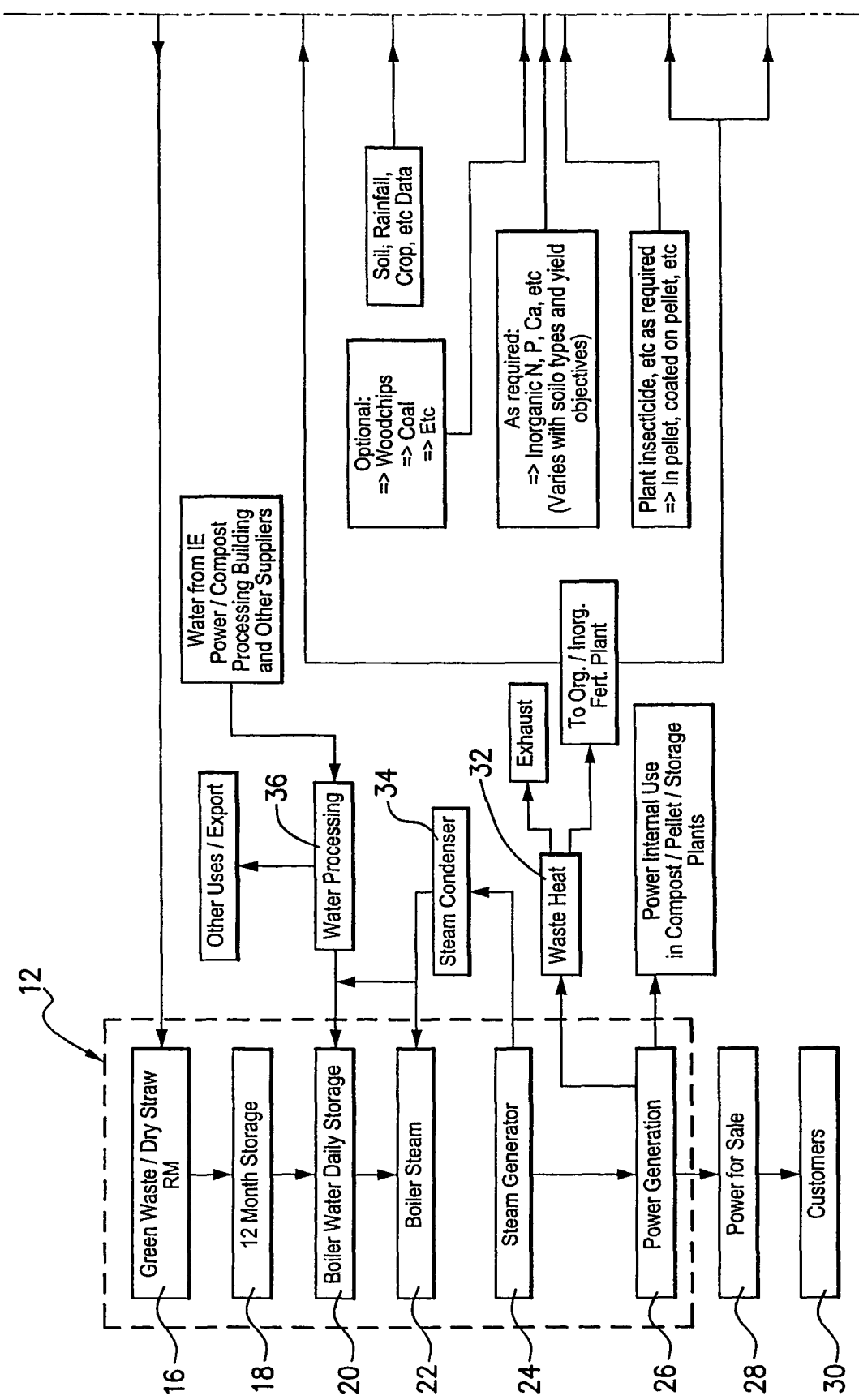
FIG. 2 is a more detailed schematic illustration of the process steps carried out within the power station and organic fertiliser production facility.

Turning to FIG. 2, the power station 12 preferably uses green waste and wheat straw 16 as a source of biomass. The biomass is stored for approximately 12 months in a storage facility 18 before it is burnt in a boiler 20. Heat from the burning biomass boils water in a boiler 22 to produce steam which in turn drive turbines in a steam generator 24 to generate electricity 26. The electricity may be supplied to the electrical grid 28 for eventual sale to customers 30.

Of course, the supply of heat to the steam generator is not 100% efficient with waste heat 32 being produced. The waste heat is captured using a conventional heat exchanger, and transferred to the fertiliser production facility 14. The captured waste heat is also redirected to the stored biomass at the power station 12 to assist in dying the biomass before combustion.

| Fertiliser | Application Rate as C kg/ha | % Crop Response | Crop | C Index % Increase in Yield/unit of C $\times 10^2$ |
| --- | --- | --- | --- | --- |
| Activated Sledge (on top of ground) | 600 | 21.1 | Tomato | 3.5 |
| Wheat Straw (on top of ground) | 4200 | 30.0 | Wheat | 0.7 |
| Pelletised poultry manure (on top of ground) | 1470 | 7.0 | Wheat | 0.5 |
| Pelletised organic fertiliser in greenhouse trial (NPKC 3 cm underground below the wheat seed in a 3 × 3 cm slot using satellite positioning technology) | 23(125 kg) | 39.00 | Wheat | 169.6 |
| Pelletised organic fertiliser (3 cm underground below the wheat seed in a 3 × 3 cm slot using satellite positioning technology) | 46(250 kg) | 27.8 | Wheat | 60.4 |

Steam from the generator 24 not used to drive the turbines may also be condensed in a condenser 34 and returned to the boiler 22 or to other water storage facilities 20 in the power station 12.

The organic fertiliser production facility 14 principally also uses biomass 38 as the feed source. Preferably, as with the power plant, wheat straw and other green waste is the preferred feed source. The green waste is transported to a storage facility 40 and stored for between approximately 6 and 18 months.

Stored biomass is then transported to a composting plant 42 where it undergoes organic decay to produce a composted fertiliser product. Waste heat 32 from the power production facility 12 is also supplied to the compost plant to continually assist in the process. The composted material is formed into pellets at a pelletiser 44 and produced as pellets 46. The pellets may need to be stored for anything up to approximately 12 months until they are applied to the soil.

The pellets are sold to customers for use in growing crops which themselves could form a feed for either the power plant or fertiliser production facility.

The particular composting process preferred is described in the applicant's pending international application WO2004/046065, which is incorporated herein by reference. The specification of that application also describes a bio-digestion plant where organic fertiliser is produced from animal waste. Such a bio-digestion plant can also be incorporated into the organic fertiliser production system of the present invention.

Preferably, inorganic constituents such as nitrogen, phosphorous and/or calcium are also fed to the pelletiser 44 to produce pellets of a blended organic/inorganic fertiliser.

In preferred embodiments the present invention operates as a "closed loop" localised system with power plants and fertiliser production facilities provided in local areas where the biomass is to be grown.

Each energy production zone will generate electrical power which in turn will be provided to the electricity grid. Rural areas will thus produce all of their own electrical needs, with any excess being sold to the grid for consumption outside of the local area.

The storage of the biomass in both the power generation and the fertiliser production facilities is not only advantageous in the processes described above but also aligns well with the usual cycle of wheat growth. In particular, in the Southern Hemisphere grains and fertilisers are sown in April, May or June and grown from May to December. The grain is stripped from the straw in October, November or December and the straw may then be provided to the power plant and fertiliser production plant in November, December, January or February.

The word 'comprising' and forms of the word 'comprising' as used in this description and in the claims do not limit the invention claimed to exclude any variants or additions. Modifications and improvements to the invention will be readily apparent to those skilled in the art. Such modifications and improvements are intended to be within the scope of this invention.

The invention claimed is:

1. A method for integrated power generation and organic fertilizer production, the method including the steps of:
   composting plant-based biomass for a period of about 2 to 18 months;
   combusting biomass to produce power;
   capturing waste heat from the biomass combustion;
   exposing the composting biomass to the captured waste heat during the composting period; and
   subsequent to the composting step, pelletizing the composted biomass into organic fertilizer pellets.

2. The method according to claim 1, wherein the composting step comprises producing pelletized organic fertilizer over a period of about 12 months.

3. The method according to claim 1, further including the step of exposing the composted biomass to the captured waste heat so as to dry the composted biomass prior to the pelletizing step.

4. The method according to claim 1, further including the step of exposing the organic fertilizer pellets to the captured waste heat while storing the organic fertilizer pellets.

5. The method according to claim 1, further including the step of exposing the biomass to the captured waste heat so as to dry the biomass prior to combustion thereof during the combusting step.

6. The method according to claim 1, wherein the same material is used in the combusting step to produce power as in the composting step, to produce the organic fertilizer pellets.

7. The method according to claim 6 wherein the material includes waste biomass from cereal crops.

8. A method according to claim 7 wherein the material includes micronized wheat straw.

9. A method according to claim 1, further including the step of incorporating inorganic additives into the composted biomass prior to pelletizing so as to produce fertilizer pellets comprising organic and inorganic constituents.

10. A method according to claim 9, wherein the incorporating step includes incorporating quantities of inorganic additives so as to produce fertilizer pellets comprising approximately 25% to 100% organic material and the balance made up of inorganic additives.

11. A method according to claim 10, wherein the incorporating step includes incorporating quantities of inorganic additives so as to produce fertilizer pellets comprising approximately 60% to 90% organic material, and the balance made up of inorganic additives.

* * * * *